US012332514B2

(12) United States Patent
Li et al.

(10) Patent No.: US 12,332,514 B2
(45) Date of Patent: Jun. 17, 2025

(54) DISPLAY DEVICE, SPLICING DISPLAY DEVICE

(71) Applicants: Beijing BOE Display Technology Co., Ltd., Beijing (CN); BOE Technology Group Co., Ltd., Beijing (CN)

(72) Inventors: Dan Li, Beijing (CN); Zhaoshou Tian, Beijing (CN); Qingshan Qu, Beijing (CN); Haijun Shi, Beijing (CN); Hongbo Feng, Beijing (CN); Bochang Wang, Beijing (CN); Changjia Fu, Beijing (CN); Zhuang Xu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/280,957

(22) PCT Filed: Feb. 22, 2023

(86) PCT No.: PCT/CN2023/077706
§ 371 (c)(1),
(2) Date: Sep. 8, 2023

(87) PCT Pub. No.: WO2023/207287
PCT Pub. Date: Nov. 2, 2023

(65) Prior Publication Data
US 2025/0028197 A1    Jan. 23, 2025

(30) Foreign Application Priority Data

Apr. 25, 2022 (CN) .......................... 202210439659.1

(51) Int. Cl.
G02F 1/1333      (2006.01)
G02F 1/1335      (2006.01)
G02F 1/13357     (2006.01)

(52) U.S. Cl.
CPC .... G02F 1/13336 (2013.01); G02F 1/133512 (2013.01); G02F 1/133528 (2013.01);
(Continued)

(58) Field of Classification Search
CPC ........... G02F 1/13336; G02F 1/133512; G02F 1/133528; G02F 1/133605; G02F 1/133606; G02F 1/133608
See application file for complete search history.

(56) References Cited

U.S. PATENT DOCUMENTS 11,500,245 B1 * 11/2022 Zhu ................... G02F 1/133607
2017/0315408 A1   11/2017 Lee et al.
(Continued)

FOREIGN PATENT DOCUMENTS

CN      106814500 A  *  6/2017  ....... G02F 1/133512
CN      106952578 A     7/2017
(Continued)

OTHER PUBLICATIONS

English Machine Translation of Huang et al, CN 106 814 500 (Year: 2024).*

(Continued)

*Primary Examiner* — Donald L Raleigh
(74) *Attorney, Agent, or Firm* — Ling Wu; Stephen Yang; Ling and Yang Intellectual Property

(57) ABSTRACT

The present disclosure provides a display device, a splicing display device, the display device includes: a display panel including a display region and a non-display region surrounding the display region, the non-display region including a bonding region; a backlight module disposed opposite (Continued)

to the display panel; a tape layer located on a peripheral side of the display panel and the backlight module, and an orthographic projection of the tape layer on a plane where the display device is located is not overlapped with an orthographic projection of the display panel on the plane where the display device is located.

19 Claims, 4 Drawing Sheets

(52) U.S. Cl.
CPC .. *G02F 1/133605* (2013.01); *G02F 1/133606* (2013.01); *G02F 1/133608* (2013.01)

(56) References Cited

U.S. PATENT DOCUMENTS

| | | | |
|---|---|---|---|
| 2018/0246365 A1* | 8/2018 | Choi | G02F 1/133 |
| 2019/0129232 A1 | 5/2019 | Itagaki | |
| 2019/0187355 A1* | 6/2019 | An | G02B 6/0026 |
| 2021/0018793 A1 | 1/2021 | Zhang | |
| 2021/0405704 A1 | 12/2021 | Su et al. | |

FOREIGN PATENT DOCUMENTS

| | | |
|---|---|---|
| CN | 108230914 A | 6/2018 |
| CN | 207458492 U | 6/2018 |
| CN | 108681131 A | 10/2018 |
| CN | 108828814 A | 11/2018 |
| CN | 209880030 U | 12/2019 |
| CN | 110908187 A | 3/2020 |
| CN | 210129366 U | 3/2020 |
| CN | 107896261 B | 7/2020 |
| CN | 111766743 A | 10/2020 |
| CN | 112002219 A | 11/2020 |
| CN | 215067622 U | 12/2021 |
| CN | 216119324 U | 3/2022 |
| CN | 114783304 A | 7/2022 |
| JP | 2007047241 A | 2/2007 |
| JP | 2019082523 A | 5/2019 |
| WO | 2012017404 A2 | 2/2012 |
| WO | 2021007891 A1 | 1/2021 |
| WO | 2021185270 A1 | 9/2021 |

OTHER PUBLICATIONS

International Search Report for PCT/CN2023/077706 Mailed Jun. 15, 2023.

* cited by examiner

DISPLAY DEVICE, SPLICING DISPLAY DEVICE

CROSS-REFERENCE TO RELATED APPLICATIONS

The present application is a U.S. National Phase Entry of International Application PCT/CN2023/077706 having an international filing date of Feb. 22, 2023, which claims priority of Chinese Application No. 202210439659.1, and entitled "Display Device, Splicing Display Device", and the contents of which are incorporated herein by reference.

TECHNICAL FIELD

The present disclosure relates to, but is not limited to, the field of display technologies, and more particularly, to a display device and a splicing display device.

BACKGROUND

With development of science and technology, splicing display devices are more and more widely used. A splicing display device is usually formed by splicing multiple independent display devices, and each independent display device includes a display panel and a backlight module. However, at present, there is a problem of tape failure in splicing display devices.

SUMMARY

The following is a summary of subject matter described herein in detail. This summary is not intended to limit the protection scope of the claims.

In a first aspect, an embodiment of the present disclosure provides a display device, including:
  a display panel, including a display region and a non-display region surrounding the display region, the non-display region including a bonding region;
  a backlight module disposed opposite to the display panel; and
  the tape layer is located on the peripheral side of the display panel and the backlight module, wherein the orthographic projection of the tape layer on a plane where the display device is located is not overlapped with an orthographic projection of the display panel on the plane where the display device is located.

In an exemplary implementation, the display device further includes a protective plate and at least portion of the protective plate is located on a peripheral side of the bonding region.

In an exemplary implementation, the tape layer includes a first tape, the first tape is attached to a side surface of the protective plate away from the bonding region, and an orthographic projection of the first tape on the plane where the display device is located is not overlapped with the orthographic projection of the display panel on the plane where the display device is located.

In an exemplary implementation, the protective plate has a protruding end, the protruding end protrudes a surface of the bonding region away from the backlight module, and the protruding end and a surface of the bonding region away from the backlight module form an L-shaped groove.

In an exemplary implementation, at least a portion of the first tape is attached to a side of the protruding end away from the bonding region.

In an exemplary implementation, a light shielding adhesive layer is further included, the light shielding adhesive layer is disposed in the L-shaped groove, the light shielding adhesive layer is respectively in contact with side surfaces of the L-shaped groove.

In an exemplary implementation, an orthographic projection of the light shielding adhesive layer on the plane where the display device is located is not overlapped with the display region.

In an exemplary implementation, the protruding end has a protruding length of 0.5 mm to 0.9 mm.

In an exemplary implementation, the tape layer further includes a second tape, the second tape is located on a peripheral side of another non-display region of the display substrate except the bonding region, and an orthographic projection of the second tape on the plane where the display device is located is not overlapped with an orthographic projection of the display panel on the plane where the display device is located.

In an exemplary implementation, the second tape includes a stretch tape and an edge wrapping tape, at least a portion of the stretch tape is attached to a side of a non-display region of the display substrate except the bonding region, and at least a portion of the edge wrapping tape is attached to a side wall of the backlight module.

In an exemplary implementation, an upper polarizer is further included, the upper polarizer is disposed on a side of the display panel away from the backlight module, and the second tape is not overlapped with a side surface of the upper polarizer.

In an exemplary implementation, a notch is provided at a side corner of the edge wrapping tape close to the stretch tape.

In an exemplary implementation, the backlight module includes a bezel, a side of the bezel close to the display panel includes a first support surface, and the first support surface is matched with a surface of the display panel close to the bezel.

In an exemplary implementation, the side of the bezel close to the display panel further includes a second support surface, the second support surface is located at a side of the first support surface away from the display panel, the display device further includes a light guide structure disposed opposite to the display panel, the light guide structure is located at a side of the display panel close to the bezel, and the second support surface is matched with a surface of the light guide structure close to the bezel.

In an exemplary implementation, the backlight module further includes a light guide strip located between the second support surface and the light guide structure.

In an exemplary implementation, the light guide strip is made of polycarbonate.

In an exemplary implementation, the side of the bezel close to the display panel further includes a support side surface connected to the first support surface and the second support surface, the backlight module further includes a diffuse reflective layer, the diffuse reflective layer is disposed on the support side surface, the diffuse reflective layer is disposed opposite to a side surface of the light guide structure, and the diffuse reflective layer is configured to diffuse reflect incident light.

In an exemplary implementation, the backlight module further includes a reflective layer, the reflective layer is disposed on an inner surface of a side wall of the backlight module, and the reflective layer is configured to reflect incident light towards the display panel.

In an exemplary implementation, a circuit board and a chip on film are further included, the circuit board and the chip on film are located on an outer side of the backlight module, one end of the chip on film is connected to the bonding region and covers a partial region of a side surface of the bonding region, and the other end of the chip on film is connected to the circuit board.

In a second aspect, an embodiment of the present disclosure further provides a splicing display device, including the display device of the first aspect.

Other aspects may become clear after the accompanying drawings and the detailed description are read and understood.

BRIEF DESCRIPTION OF DRAWINGS

Accompanying drawings are used for providing understanding of technical solutions of the present disclosure, and form a part of the specification. They are used for explaining the technical solutions of the present disclosure together with embodiments of the present disclosure, but do not form a limitation on the technical solutions of the present disclosure.

DETAILED DESCRIPTION

Figure 1:
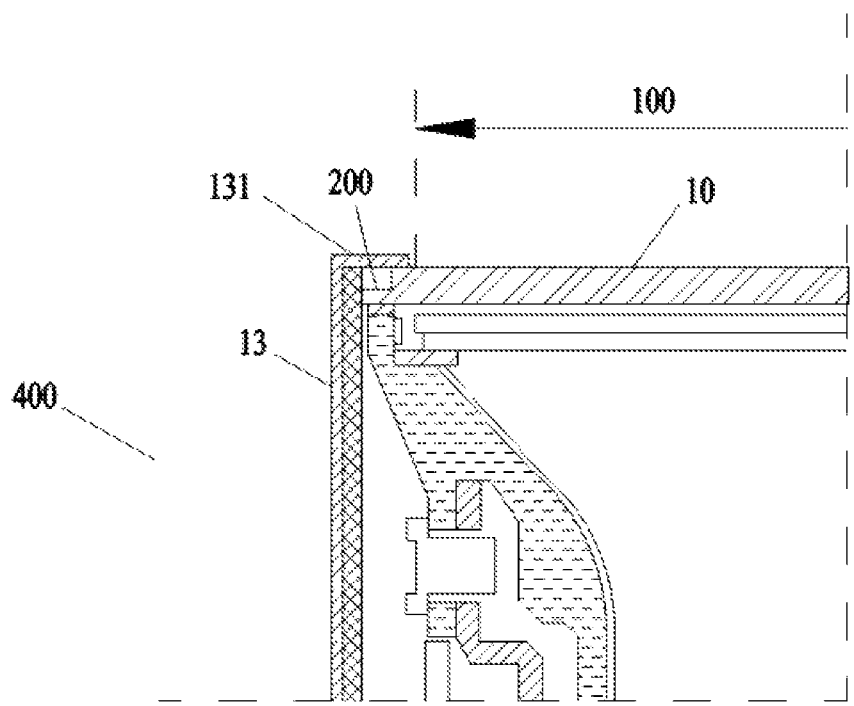
FIG. 1 is a first sectional view of a display device in the related art.

To make objectives, technical solutions, and advantages of the present disclosure clearer, embodiments of the present disclosure will be described in detail with reference to the accompanying drawings. It is to be noted that implementations may be practiced in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of a constituent element, a thickness of a layer, or a region is exaggerated sometimes for clarity. Therefore, one implementation of the present disclosure is not necessarily limited to the sizes, and shapes and sizes of various components in the drawings do not reflect actual scales. In addition, the drawings schematically illustrate ideal examples, and one implementation of the present disclosure is not limited to shapes, numerical values, or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "rear", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or an internal communication between two elements. Those of ordinary skills in the art may understand specific meanings of the above terms in the present disclosure according to specific situations.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

Figure 2:
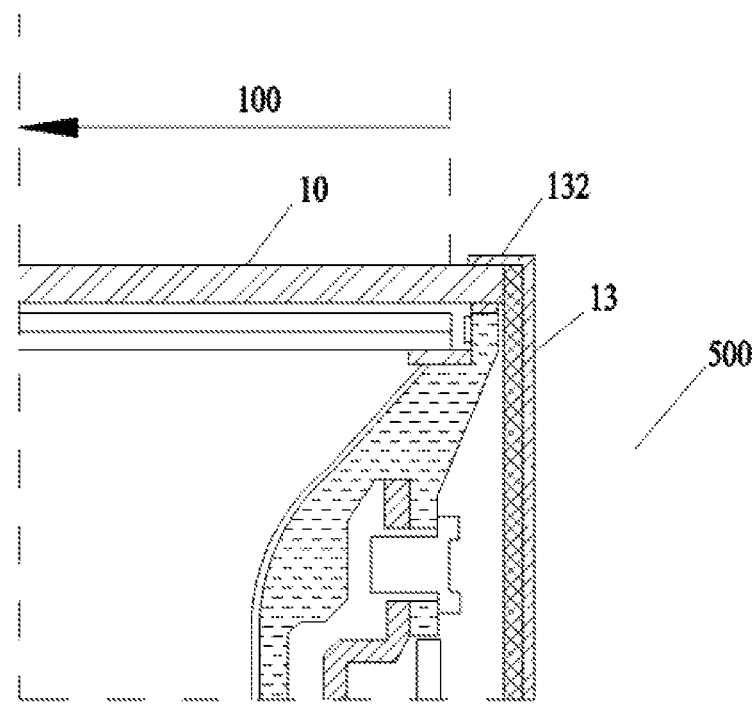
FIG. 2 is a second sectional view of a display device in the related art.

FIG. 1 is a first sectional view of a display device in the related art. FIG. 2 is a second sectional view of a display device in the related art. As shown in FIG. 1 and FIG. 2, in the related art, a display device includes a display panel 10 and a backlight module disposed oppositely, the backlight module includes a bezel, and the display panel 10 includes a display region and a non-display region surrounding the display region. The non-display region includes a first non-display region located on a first side 400 of the display device and a second non-display region located on a second side 500 of the display device. The first non-display region may include a bonding region 200. In the related art, the display device further includes a light shielding tape 13 located on a circumferential side of the display panel 10. The light shielding tape 13 may be located on a side of the bonding region 200 away from the display region 100 and a side of the second non-display region away from the display region 100, respectively.

According to a research conducted by the inventor of the present disclosure, as shown in FIG. 1, on the first side 400 of the display device, the light shielding tape 13 has a first edge wrapping part 131, the first edge wrapping part 131 is bent toward a surface of the bonding region 200 and is attached to a surface of an upper polarizer of the display panel 10 for shielding an edge of the display panel 10 and preventing light leakage at the edge of the display panel 10. However, since the bonding region 200 is bound to a chip on film (COF for short), it is necessary to coat a UV adhesive layer at a bonding position of the bonding region 200, a surface of the UV adhesive layer cannot be flush with a surface of the display region 100 due to characteristics of the UV adhesive layer, resulting in a gap between the bonding region 200 and the first edge wrapping part 131, causing a portion of the first edge wrapping part 131 to be suspended, and leading to a problem that the first edge wrapping part 131 is prone to upwarp.

Moreover, the display panel 10 includes an array substrate and a color filter substrate which are aligned with each other, and an upper polarizer disposed on a side of the color filter substrate away from the array substrate. The first edge wrapping part 131 is attached to a surface of the upper polarizer. In order to prevent the chip on film (COF for short) from being burned when cutting the upper polarizer, an edge of the upper polarizer is located at an inner side of an edge of the color filter substrate, and the first edge wrapping part 131 cannot be fully bonded to the upper polarizer, so that an attached area between the first edge wrapping part 131 and the upper polarizer is small, and the first edge wrapping part 131 is prone to the problem of tape failure. For example, a distance from the edge of the upper polarizer to the edge of the color filter substrate is about 0.15 mm, a length of an overlapped region between the first edge wrapping part 131 and the color filter substrate is 0.5 mm, and a length of an attached portion between the first edge wrapping part 131 and the upper polarizer is 0.45 mm.

According to the research conducted by the inventor of the present disclosure, as shown in FIG. 2, on the second side 500 of the display device, the light shielding tape 13 has a second edge wrapping part 132, the second edge wrapping part 132 is bent toward a surface of the display panel 10 and is attached to a surface of the upper polarizer of the display panel 10 for shielding an edge of the display panel 10 and preventing light leakage at the edge of the display panel 10. Since the second edge wrapping part 132 needs to be attached by lighting when the second edge wrapping part 132 is attached, an operation difficulty and a rework rate are high, resulting in a waste of work time. Moreover, when the display device is in use, the second edge wrapping part 132 is prone to being scratched, resulting in defects of the second edge wrapping part 132 such as upwarp and light leakage.

A display device is provided in an embodiment of the present disclosure, including:

a display panel;

a backlight module disposed opposite to the display panel;

a tape layer, located on a peripheral side of the display panel and the backlight module, and an orthographic projection of the tape layer on a plane where the display device is located is not overlapped with an orthographic projection of the display panel on the plane where the display device is located.

Figure 3:
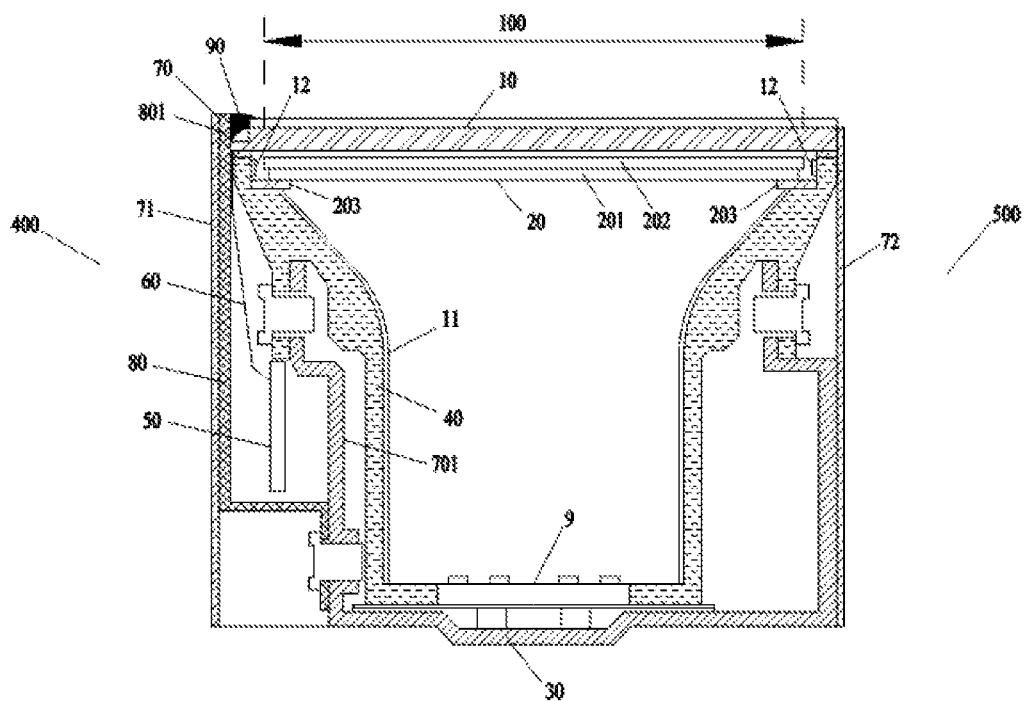
FIG. 3 is a sectional view of a display device according to an embodiment of the present disclosure.

Each portion of the display device according to an embodiment of the present disclosure will be described in detail below:

FIG. 3 is a sectional view of a display device according to an embodiment of the present disclosure. As shown in FIG. 3, the display device includes a display panel 10, a backlight module, and a tape layer 70. The display panel 10 and the backlight module are disposed oppositely, and the tape layer 70 is positioned on a peripheral side of the display panel 10 and the backlight module. An orthographic projection of the tape layer 70 on a plane where the display device is located is not overlapped with the orthographic projection of the display panel 10 on the plane where the display device is located, that is, the tape layer 70 does not cover a surface of the display panel 10 away from the backlight module in a direction perpendicular to the display panel 10, thereby avoiding upwarp of the tape layer 70 and solving the problem of light leakage of the display device due to the upwarp of the tape layer 70.

The tape layer 70 can reinforce stability of the display device, and also has a function of preventing Electro-Magnetic Interference (EMI for short) and achieving electrostatic shielding. In addition, the tape layer 70 can prevent light leakage.

As shown in FIG. 3, the display device includes a first side 400 and a second side 500 opposite to each other in a direction parallel to the display device.

Figure 4:
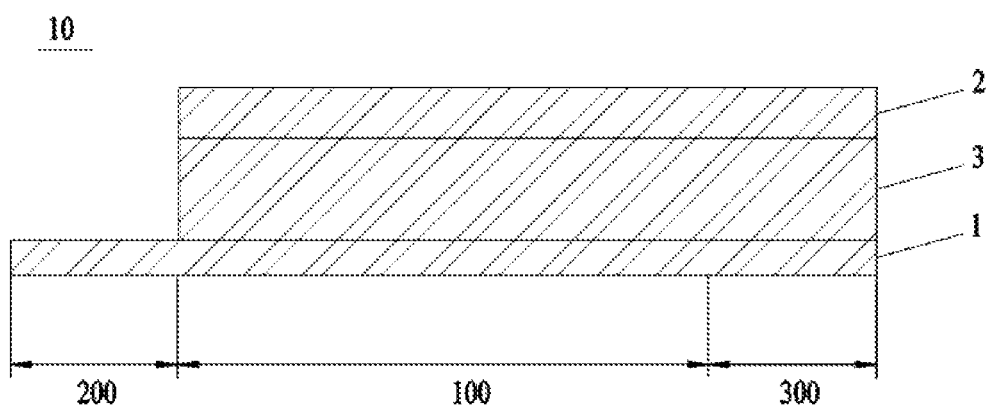
FIG. 4 is a schematic diagram of a structure of a display panel in a display device according to an embodiment of the present disclosure.

FIG. 4 is a schematic diagram of a structure of a display panel in a display device according to an embodiment of the present disclosure. In an exemplary implementation, the display panel 10 may be a liquid crystal display panel, which may include an array substrate 1 and a color filter substrate 2 disposed aligned with each other, and a liquid crystal layer 3 disposed between the array substrate 1 and the color filter substrate 2. The display panel 10 may include a display region 100 and a non-display region surrounding the display region 100. The non-display region includes a first non-display region located on the first side 400 of the display device and a second non-display region 300 located on the second side 500 of the display device. The first non-display region may include a bonding region 200. An orthographic projection of the color filter substrate 2 and an orthographic projection of the liquid crystal layer 3 on a plane where the display panel 10 is located is not overlapped with the bonding region 200. A thickness of the bonding region 200 is smaller than a thickness of the display region 100. The bonding region 200 includes multiple bonding electrodes for bonding with a chip on film (COF for short).

In the direction perpendicular to the display panel 10, the display panel 10 includes a light incidence side and a light exit side opposite to each other. The light incidence side is a side of the display panel 10 close to the backlight module and the light exit side is a side of the display panel 10 away from the backlight module. The display device further includes an upper polarizer and a lower polarizer. The upper polarizer is disposed on the light exit side of the display panel 10 and the lower polarizer is disposed on the light incidence side of the display panel 10.

In an exemplary implementation, as shown in FIG. 3, the backlight module includes a light guide structure 20, and the light guide structure 20 disposed opposite to the display panel 10 and located on the light incidence side of the display panel 10. The light guide structure 20 may include a diffusion plate 201. The diffusion plate 201 and the display panel 10 may be disposed oppositely. A material of the diffusion plate 201 may be polystyrene (PS for short), but this disclosure is not limited thereto. The light guide structure 20 may include a diffusion sheet 202. The diffusion sheet 202 is stacked on a side of the diffusion plate 201 close to the display panel 10.

Figure 5:
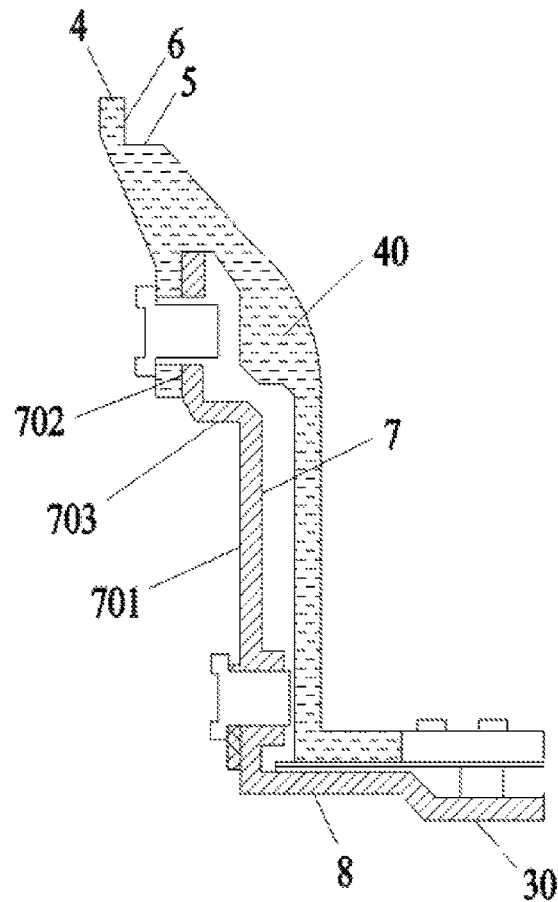
FIG. 5 is a partial sectional view of a bezel in a display device according to an embodiment of the present disclosure.

FIG. 5 is a partial sectional view of a bezel in a display device according to an embodiment of the present disclosure. In an exemplary implementation, as shown in FIG. 3 and FIG. 5, the backlight module further includes a bezel whose side close to the display panel 10 includes a first support surface 4 and a second support surface 5. The first support surface 4 may be parallel to the display panel 10. The first support surface 4 is matched with a surface of the display panel 10 close to the bezel so that the bezel is connected to the display panel 10. Specifically, a fixing adhesive is coated on the first support surface 4 and the first support surface 4 is attached to a lower polarizer located on a surface of the display panel 10 close to a side of the bezel by the fixing adhesive. The fixing adhesive on the first support surface 4 is attached to an edge region of the lower polarizer. The first support surface 4 may be strip-shaped and parallel to a side edge of the display panel 10. The second support surface 5 may be parallel to the first support surface 4. The second support surface 5 is located on a side of the first support surface 4 away from the display panel. That is, a distance between the first support surface 4 and the display panel is smaller than a distance between the second support surface 5 and the display panel. Among them, a distance between the first support surface 4 and the second support surface 5 in the direction perpendicular to the display panel 10 needs to be greater than or equal to a thickness of the light guide structure 20. The second support surface 5 is matched with a surface of the light guide structure 20 close to the bezel, i.e., the second support surface 5 supports the light guide structure 20. As an example, the light guide structure 20 includes a diffusion plate 201 and a diffusion sheet 202, and the second support surface 5 is used for supporting the diffusion plate 201.

In an exemplary implementation, as shown in FIG. 3 and FIG. 5, a side of the bezel close to the display panel further includes a support side surface 6 connected to the first support surface 4 and the second support surface 5. As an example, the first support surface 4 and the second support surface 5 parallel to each other, the support side surface 6 may be perpendicular to the second support surface 5, thereby forming a step structure on the bezel, and the step surfaces of the step structure are the second support surface 5 and the support side surface 6.

Figure 6:
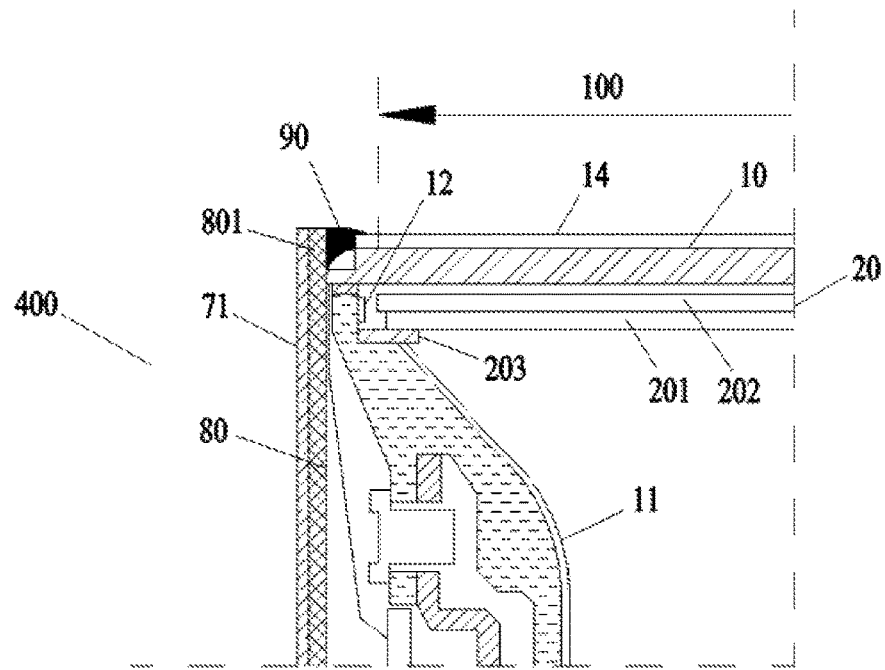
FIG. 6 is a partial sectional view of a first side of a display device according to an embodiment of the present disclosure.

FIG. 6 is a partial sectional view of a first side of a display device according to an embodiment of the present disclosure. In an exemplary implementation, as shown in FIG. 3 and FIG. 6, the backlight module further includes a light guide strip 203 and the light guide strip 203 is located between the bezel and the light guide structure 20. Specifically, the light guide strip 203 is located between the second support surface 5 and the diffusion plate 201. A surface of the light guide strip 203 close to the diffusion plate 201 and a surface of the light guide strip 203 close to the second support surface 5 may each be provided with an adhesive layer. The adhesive layer on the surface of the light guide strip 203 close to the diffusion plate 201 is attached to the diffusion plate 201, and the adhesive layer on the surface of the light guide strip 203 close to the second support surface 5 is attached to the second support surface 5, so that the light guide strip 203 is attached between the diffusion plate 201 and the second support surface 5. The light guide strip 203 may be made of a polycarbonate (PC for short) material or a polystyrene (PS for short) material and a light transmittance of the light guide strip 203 may be greater than 99%. The light guide strip 203 is made of polycarbonate (PC for short), which has lower expansion rate than polystyrene (PS for short), and can effectively prevent problems such as defects caused by expansion of the light guide strip. The backlight in the display device can effectively pass through the light guide strip 203 to an edge of the display panel 10 and problems such as a dark bezel can be prevented. A thickness of the light guide strip 203 may be 1 mm to 2 mm, for example, the thickness of the light guide strip 203 may be 1.4 mm. A width of the light guide strip 203 may be 2 mm to 4 mm, for example, the width of the light guide strip 203 may be 3.5 mm.

In an exemplary implementation, a distance between an edge of the aforementioned light guide strip 203 and the support side surface 6 is smaller than a distance between an edge of the diffusion plate 201 and the support side surface 6.

In an exemplary implementation, as shown in FIG. 3 and FIG. 5, the bezel may include a back plate 30 and a middle bezel 40. The back plate 30 may include a bottom wall 8 and a side wall 7. The bottom wall 8 may be disposed opposite to the display panel 10 described above and on a side of the light guide structure 20 away from the display panel. The side wall 7 is connected to a side of the bottom wall 8 close to the display panel and is provided on a periphery of the bottom wall 8. The side wall 7 may include a first wall body 701 and a second wall body 702 connected to each other. The second wall body 702 is located on a side of the first wall body 701 away from the bottom wall 8. The side wall 7 may further include a third wall body 703 connected to the first wall body 701 and the second wall body 702. The first wall body 701 and the second wall body 702 may both be perpendicular to the bottom wall 8. The third wall body 703 may be parallel to the bottom wall 8, while the present disclosure is not specifically limited thereto.

In an exemplary implementation, as shown in FIG. 3 and FIG. 5, on the first side of the display device, the first wall body 701 in the bezel is recessed toward an inner side of the side wall 7 relative to the second wall body 702, that is, the second wall body 702 is located at an outer side of the first wall body 701. The first wall body 701 may form an accommodation space with a protective plate 80 to be described below.

In an exemplary implementation, as shown in FIG. 3 and FIG. 5, the middle bezel 40 may be fixed to the back plate 30, for example the middle bezel 40 may be fixed to the second wall body 702 of the back plate 30 by screws. The first support surface 4 and the second support surface 5 are both located at one end of the middle bezel 40 close to the display panel, that is, the one end of the middle bezel 40 close to the display panel includes the first support surface 4 and the second support surface 5, and the one end of the middle bezel 40 away from the display panel is in contact with the bottom wall 8 of the back plate 30, so that the middle bezel 40 is supported on the bottom wall 8 of the back plate 30.

In an exemplary implementation, the middle bezel 40 is a supporting device for supporting the back plate 30 and the light guide structure 20, and between the back plate 30 and the display panel, and needs to have certain strength. In order to ensure an assembly size and improve the assembly accuracy, the middle bezel 40 may be made of a metal extrusion profile to ensure dimensional accuracy, straightness and overall strength of the backlight module. For example, an aluminum alloy extruded profile or a magnesium alloy extruded profile may be used for the middle bezel 40, and the metal extruded profile has a relatively flat surface, so that the first support surface 4 and the second support surface 5 in the middle bezel 40 can be flattened, and flatness of the light guide structure 20 and the display panel 10 after installation can be ensured. In other exemplary embodiments, the middle bezel 40 may also be a rubber frame.

In an exemplary implementation, as shown in FIG. 3, the display device of the present disclosure may further include a circuit board 50 and a chip on film 60 (COF for short). The circuit board 50 and the chip on film 60 (COF for short) may be located on the first side of the display device and on an outer side of the backlight module. One end of the chip on film 60 is connected to the bonding region 200 of the display panel 10, one end of the chip on film 60 covers a partial region of a side surface of the bonding region, and the other end of the chip on film 60 is connected to the circuit board 50. Of course, the chip on film 60 may cover a partial region of a side surface of another side of the display panel. The circuit board 50 may be located at an outer side of the bezel and electrically connected to the chip on film 60. The circuit board 50 may be located at an outer side of the side wall 7 of the back plate 30 and disposed oppositely to the first wall body 701 of the side wall 7 of the back plate 30.

In an exemplary implementation, as shown in FIG. 3, the display device of the present disclosure may further include a light emitting substrate 9. The light emitting substrate 9 may be disposed on a surface of the bottom wall 8 close to the display panel 10 and includes multiple light sources. The multiple light sources are configured to provide backlight for the display panel.

In an exemplary implementation, a structure of the light sources in the light emitting substrate 9 may not be limited as long as light can be emitted. For example, a light source in the light emitting substrate 9 may be a blue Mini LED or a blue Micro LED. A typical size (e.g., length) of a Micro-LED may be less than 50 μm, e.g., 10 μm to 50 μm. A typical dimension (e.g., length) of a Mini LED may be about 50 μm to 150 μm, e.g., 80 μm to 120 μm. Mini LEDs or Micro LEDs can be transferred to the light emitting substrate 9 in batches, and by cooperation with the driving design, light emitting of the light emitting substrate 9 can be achieve.

In an exemplary implementation, as shown in FIG. 3 and FIG. 6, the backlight module further includes a reflective layer 11, and the reflective layer 11 is disposed on an inner surface of a sidewall of the backlight module. The reflective layer 11 may be disposed along a periphery of the light emitting substrate 9. Specifically, the reflective layer 11 is provided on the inner surface of the middle bezel 40. The reflective layer 11 is configured to reflect incident light towards the display panel 10. Part of the light emitted from the light sources in the light emitting substrate 9 is emitted towards the display panel 10, and part of the light is emitted towards the middle bezel 40. The light emitted towards the middle bezel 40 enters the reflective layer 11, the reflective layer 11 reflects the incident light towards the display panel 10, thereby avoiding loss of the light emitted from the light emitting substrate 9 and improving a brightness of the backlight provided by the backlight module.

In an exemplary embodiment, as shown in FIG. 3 and FIG. 6, the backlight module further includes a diffuse reflective layer 12, and the diffuse reflective layer 12 is disposed on an inner surface of a side wall of the bezel and located at an end of the bezel adjacent to the display panel. The diffuse reflective layer may be disposed along the periphery of the light emitting substrate 9. Specifically, the diffuse reflective layer 12 is disposed on the support side surface 6 of the bezel and disposed opposite to a side surface of the light guide structure 20. The diffuse reflection layer 12 is configured to diffuse the incident light, effectively diffuse the incident light at an edge of the display panel, and avoid problems such as bright lines around the display panel.

In an exemplary implementation, as shown in FIG. 3 and FIG. 6, the display device of the present disclosure further includes a protective plate 80, and at least a portion of the protective plate 80 may be connected to the outer side of the bezel. For example, the protective plate 80 is located at the outer side of the first wall body 701. Among them, the protective plate 80 may be threaded to the first wall body 701, while the embodiments of the present disclosure are not specifically limited thereto.

In an exemplary implementation, as shown in FIG. 3 and FIG. 6, the protective plate 80 is located on the first side of the display device, the protective plate 80 is located in the bonding region 200 in the display panel 10 and on a peripheral side of the side wall of the bezel located on the first side of the display device, i.e., the protective plate 80 is located on a side of the bonding region 200 away from the display region 100 and is disposed opposite to the side surface of the bonding region 200 and the side wall of the bezel located on the first side of the display device. An accommodation space is formed between the protective plate 80 and the first wall body 701 of the bezel, and the aforementioned circuit board 50 is located in the accommodation space. The protective plate 80 has a protruding end 801, and the protruding end 801 protrudes from a surface of the bonding region 200 in the display panel 10 on a side away from the backlight module and the protruding end 801 forms an L-shaped groove with a surface of the bonding region 200 away from the backlight module. Among them, the L-shaped groove includes a side surface and a bottom surface, the side surface of the L-shaped groove is a surface of the protruding end 801 close to the display panel, and the bottom surface of the L-shaped groove is the surface of the bonding region 200 away from the backlight module. Among them, a protruding length of the protruding end 801 may be 0.1 mm to 1 mm, for example, the protruding length of the protruding end 801 may be 0.5 mm to 0.9 mm.

In an exemplary embodiment, as shown in FIG. 3 and FIG. 6, the tape layer 70 includes a first tape 71, the first type 71 is attached to an outer surface of the protective plate 80, i.e., the first tape 71 is attached to a side surface of the protective plate 80 away from the bonding region 200. A portion of the first tape 71 is attached to an outer surface of the protruding end 801 of the protective plate 80 and is disposed opposite to a side surface of the bonding region 200 away from the display region. A portion of the first tape 71 is opposite to a side edge of the bezel. An orthographic projection of the first tape 71 on the plane where the display device is located is not overlapped with the orthographic projection of the display panel 10 on the plane where the display device is located, namely, the first tape 71 does not cover the display panel in a direction perpendicular to the display panel, and the first tape 71 does not need to be bent to cover the display panel, thus effectively solving the problems of poor attachment of the first tape 71 in a production process and scratching occurred when a client takes the display device, which results in upwarp of the first tape 71, light leakage and the like.

In an exemplary implementation, the display device of the present disclosure further includes a light shielding adhesive layer 90, the light shielding adhesive layer 90 is disposed in a L-shaped groove. The light shielding adhesive layer 90 is in contact with a side surface of the L-shaped groove, shields a gap between the protective plate 80 and the side surface of the bonding region 200, prevents light from leaking out from the gap, and solves the problem of light leakage at an edge of the display device of the present disclosure.

In an exemplary implementation, the light shielding adhesive layer 90 does not cover the display region 100, i.e. an orthographic projection of the light shielding adhesive layer 90 on the plane where the display device is located is not overlapped with the display region 100, preventing the light shielding adhesive layer 90 from shielding the display region 100. The light shielding adhesive layer 90 may be made of a black hot melt adhesive, and the light shielding adhesive layer 90 may be formed by dispensing glue on a side surface of the bonding region 200 away from the backlight module by a dispensing machine. The light shielding adhesive layer 90 may be made of polyurethane adhesive with low light transmittance, so that the light shielding adhesive layer 90 satisfies fluidity and light shielding property, thereby preventing the light shielding adhesive layer 90 from entering the display region 100 with excessive fluidity and shielding light leakage at an edge of the display panel.

Figure 7:
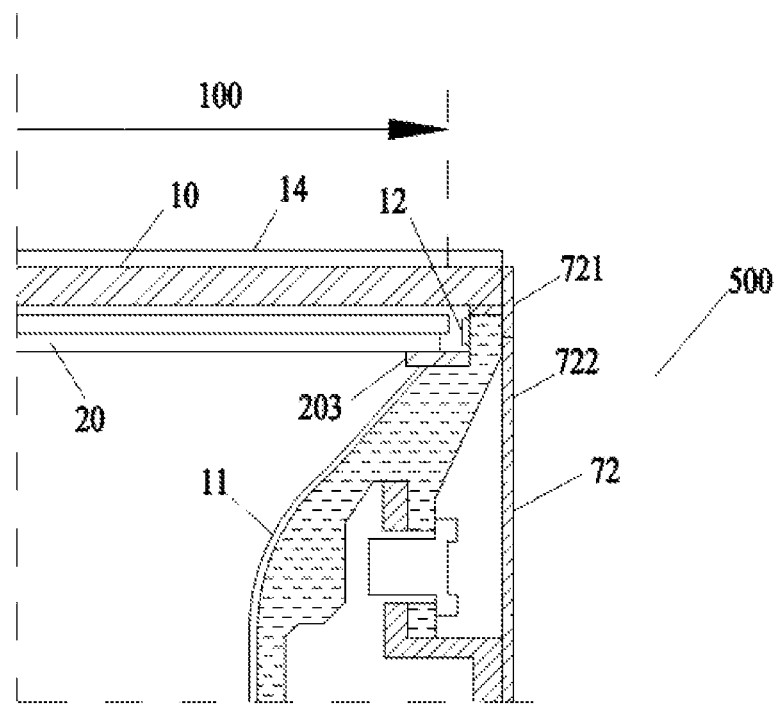
FIG. 7 is a partial sectional view of a second side of a display device according to an embodiment of the present disclosure.

FIG. 7 is a partial sectional view of a second side of a display device according to an embodiment of the present disclosure. In an exemplary implementation, as shown in FIG. 3 and FIG. 7, the tape layer 70 further includes a second tape 72, the second type 72 may be located on a side of the display device other than the first side 400, that is, the second tape 72 may be located on a peripheral side of other non-display regions of the display substrate 10 other than the bonding region.

In an exemplary implementation, as shown in FIG. 3 and FIG. 7, as an example, the second tape 72 may be located on the second side 500 of the display device. The second tape 72 may be located on a side of the second non-display region 300 away from the display region 100. A portion of the second tape 72 is attached to a side surface of the second non-display region 300 away from the display region 100, and a portion of the second tape 72 is attached to an outer surface of the side wall of the bezel. An orthographic projection of the second tape 72 on the plane where the display device is located is not overlapped with an orthographic projection of the display panel 10 on the plane where the display device is located, i.e. the second tape 72 does not cover the display panel in a direction perpendicular to the display panel, and the second tape 72 does not need to be bent to cover the display panel, thus effectively solving the problems such as poor attachment of the second tape 72 in the production process, scratching occurred when a client takes the display device, which results in upwarp of the second tape 72, light leakage and the like.

In an exemplary implementation, as shown in FIG. 3 and FIG. 7, the second tape 72 includes a stretch tape 721 and an edge wrapping tape 722. A portion of the stretch tape 721 is attached to a side surface of the display panel 10, and a portion of the edge wrapping tape 721 is attached to the outer surface of the side wall of the bezel. The edge wrapping tape 722 is attached to the outer surface of the side wall of the bezel, and an end of the edge wrapping tape 722 close to the stretch tape 721 may cover a portion of the stretch tape 721. The stretch tape 721 has good ductility and can block light, and is not prone to scratching and upwarping.

In an exemplary implementation, the stretch tape 721 is not overlapped with a side surface of the upper polarizer 14 on the display panel 10, i.e., the stretch tape 721 does not cover the side surface of the upper polarizer 14. In the display device of the present disclosure, the stretch tape 721 can first be attached to the side surface of the display panel, and then the upper polarizer is attached to the display panel, so as to avoid the stretch tape 721 from upwarping when the display device is used by scratching an edge of the upper polarizer 14.

Figure 8:
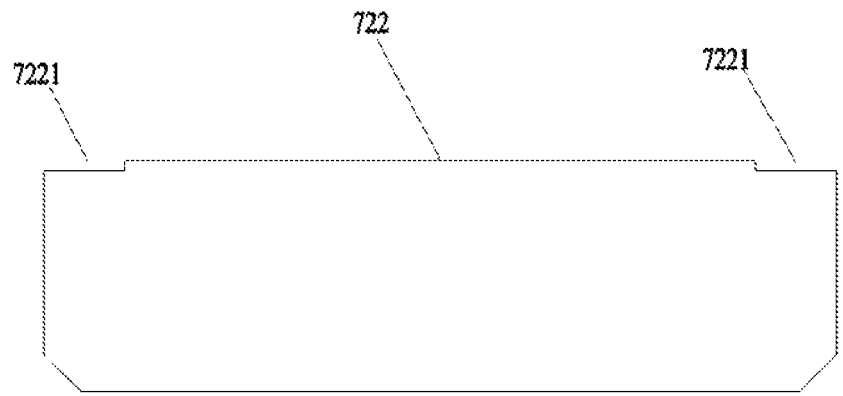
FIG. 8 is a schematic diagram of a structure of an edge wrapping tape in a display device according to an embodiment of the present disclosure.

FIG. 8 is a schematic diagram of a structure of an edge wrapping tape in a display device according to an embodiment of the present disclosure. In an exemplary implementation, as shown in FIG. 8, the edge wrapping tape 722 is provided with a notch 7221 at a side corner close to the stretch tape 721 and the notch 7221 may be L-shaped. The notch 7221 can prevent the edge wrapping tape 722 from upwarping and can prevent the edge wrapping tape 722 from upwarping due to deformation of the display device in harsh environments, such as high temperature and high humidity.

An implementation of the present disclosure further provides a splicing display device. The splicing display device can be spliced by multiple display devices in the aforementioned implementations. Since the splicing display device of the implementation of the present disclosure includes a same display device as the display device in the implementations of the above display device, it has a same beneficial effect, which will not be repeated in the present disclosure.

Although the implementations disclosed in the present disclosure are as above, the described contents are only implementations used for convenience of understanding the present disclosure and are not intended to limit the present disclosure. Those skilled in the art may make any modification and change in the forms and details of the implementations without departing from the essence and scope of the present disclosure. However, the scope of protection of the present disclosure should still be subject to the scope defined by the attached claims.

The invention claimed is:

1. A display device, comprising:
a display panel, comprising a display region and a non-display region surrounding the display region, the non-display region comprising a bonding region;
a backlight module disposed opposite to the display panel;
a tape layer located on a peripheral side of the display panel and the backlight module, wherein an orthographic projection of the tape layer on a plane where the display device is located is not overlapped with an orthographic projection of the display panel on the plane where the display device is located,
wherein the display device further comprises a circuit board and a chip on film, wherein the circuit board and the chip on film are located on an outer side of the backlight module, one end of the chip on film is connected to the bonding region and covers a partial region of a side surface of the bonding region, and the other end of the chip on film is connected to the circuit board.

2. The display device according to claim 1, further comprising a protective plate, wherein at least a portion of the protective plate is located on a peripheral side of the bonding region.

3. The display device according to claim 2, wherein the tape layer comprises a first tape, the first tape is attached to a side surface of the protective plate away from the bonding region, and an orthographic projection of the first tape on the plane where the display device is located is not overlapped with the orthographic projection of the display panel on the plane where the display device is located.

4. The display device according to claim 3, wherein the protective plate has a protruding end, the protruding end protrudes a surface of the bonding region away from the backlight module, and the protruding end and a surface of the bonding region away from the backlight module form an L-shaped groove.

5. The display device according to claim 4, wherein at least a portion of the first tape is attached to a side of the protruding end away from the bonding region.

6. The display device according to claim 4, further comprising a light shielding adhesive layer, wherein the light shielding adhesive layer is disposed in the L-shaped groove, the light shielding adhesive layer is respectively in contact with side surfaces of the L-shaped groove.

7. The display device according to claim 6, wherein an orthographic projection of the light shielding adhesive layer on the plane where the display device is located is not overlapped with the display region.

8. The display device according to claim 4, wherein the protruding end has a protruding length of 0.5 mm to 0.9 mm.

9. The display device according to claim 1, wherein the tape layer further comprises a second tape, the second tape is located on a peripheral side of another non-display region of the display substrate except the bonding region, and an orthographic projection of the second tape on the plane where the display device is located is not overlapped with an orthographic projection of the display panel on the plane where the display device is located.

10. The display device according to claim 9, wherein the second tape comprises a stretch tape and an edge wrapping tape, at least a portion of the stretch tape is attached to a side surface of the non-display region of the display substrate except the bonding region, and at least a portion of the edge wrapping tape is attached to a side wall of the backlight module.

11. The display device according to claim 10, further comprising an upper polarizer, wherein the upper polarizer is disposed on a side of the display panel away from the backlight module, and the second tape is not overlapped with a side surface of the upper polarizer.

12. The display device according to claim 10, wherein a notch is provided at a side corner of the edge wrapping tape close to the stretch tape.

13. The display device according to claim 1, wherein the backlight module comprises a bezel, a side of the bezel close to the display panel comprises a first support surface, and the first support surface is matched with a surface of the display panel close to the bezel.

14. The display device according to claim 13, wherein the side of the bezel close to the display panel further comprises a second support surface, the second support surface is located at a side of the first support surface away from the display panel, the display device further comprises a light guide structure disposed opposite to the display panel, the light guide structure is located at a side of the display panel close to the bezel, and the second support surface is matched with a surface of the light guide structure close to the bezel.

15. The display device according to claim 14, wherein the backlight module further comprises a light guide strip located between the second support surface and the light guide structure.

16. The display device according to claim 15, wherein the light guide strip is made of polycarbonate.

17. The display device according to claim 14, wherein the side of the bezel close to the display panel further comprises a support side surface connected to the first support surface and the second support surface, the backlight module further comprises a diffuse reflective layer, the diffuse reflective layer is disposed on the support side surface, the diffuse reflective layer is disposed opposite to a side surface of the light guide structure, and the diffuse reflective layer is configured to diffuse reflect incident light.

18. The display device according to claim 1, wherein the backlight module further comprises a reflective layer, the reflective layer is disposed on an inner surface of a side wall of the backlight module, and the reflective layer is configured to reflect incident light towards the display panel.

19. A splicing display device, comprising the display device according to claim 1.

* * * * *